United States Patent [19]
Endriz

[11] 4,030,090
[45] June 14, 1977

[54] FLAT IMAGE DISPLAY DEVICE UTILIZING DIGITAL MODULATION

[75] Inventor: John Guiry Endriz, Plainsboro, N.J.

[73] Assignee: RCA Corporation, New York, N.Y.

[22] Filed: Dec. 17, 1975

[21] Appl. No.: 641,641

[52] U.S. Cl. .................. 340/324 M; 313/105 CM; 340/166 EL; 340/343

[51] Int. Cl.² ........................................ G09F 9/32

[58] Field of Search .......... 340/343, 324 R, 324 M, 340/166 EL; 313/105 CM

[56] References Cited
UNITED STATES PATENTS

| | | | |
|---|---|---|---|
| 3,408,532 | 10/1968 | Hultberg et al. ............ | 313/105 CM |
| 3,745,554 | 7/1973 | Grant .............................. | 340/324 R |
| 3,947,841 | 3/1976 | Tumolillo .......................... | 340/343 |

*Primary Examiner*—Marshall M. Curtis
*Attorney, Agent, or Firm*—Glenn H. Bruestle; William H. Murray; Carl L. Silverman

[57] ABSTRACT

An evacuated envelope having therein a vertical by horizontal matrix of cells. Each cell includes a line electron source; a digital modulation section; an electron accelerating and focusing region; and a cathodoluminescent phosphor screen. The digital modulation section includes a modulation mask disposed between the line electron sources and the electron accelerating and focusing region. The modulation mask comprises a metal sheet having a plurality of slots therein. Each slot is aligned within a cell and is surrounded by a sensing pad disposed on a surface of the modulation mask which faces the line electron sources, and by a modulation electrode disposed on the opposite surface. A digitally pulsed flow of electrons, produced by the line electron sources, is directed toward the modulation mask. A series of digital voltage pulses are applied to the modulating electrodes. The voltage pulses are synchronized with the digitally pulsed electron flow such that when a voltage pulse appears on the modulating electrodes the corresponding pulse from the line electron source will be denied passage through the slot in the modulation mask. The sensing pads are charged to a desired voltage in order to regulate the level of the pulses which are permitted passage through the slots in the modulation mask. The level of brightness produced at each of the cells in the matrix is a function of the number of digital pulses permitted to pass through the slots in the modulation mask as well as the level of these pulses.

13 Claims, 10 Drawing Figures

FLAT IMAGE DISPLAY DEVICE UTILIZING DIGITAL MODULATION

BACKGROUND OF THE INVENTION

This invention relates to a flat cathodoluminescent image display device employing a modulation mask and particularly to a modulation mask employing digital control circuitry.

One form of a flat image display device, to which the present invention relates, includes a multiplicity of cells which may include spaced parallel channels. Each of the cells includes all the necessary components for forming at least a single element of an image display. Typically, each cell includes a line source of electrons which may comprise a source of primary electrons, hereinafter referred to as the cathode, and a multi-dynode electron multiplier open to feedback and of sufficiently high gain to produce regenerative feedback so as to provide a self-sustaining source of electrons. The cell also includes means for modulating the flow of electrons which exit from the multiplier. In addition, the cell includes means for accelerating and focusing the modulated flow of electrons to a cathodoluminescent screen excitable by the accelerated and modulated flow of electrons.

A device of the type utilizing a matrix of cathodoluminescent cells is operated by suitably addressing the cells in a desired sequence, for example as in a typical television scan. In one form of a flat image display device to which the present invention relates, for example one which employs multi-dynode line electron multipliers for generating the required flow of electrons, line scanning is accomplished in the following manner. Accelerating voltages are applied to every dynode in the horizontal line multiplier which is required to produce a flow of electrons and a repelling voltage is applied to at least one dynode of the remaining horizontal line multipliers in order to turn off the flow of electrons in those multipliers. Consequently, each horizonal line can be turned on in any desired sequence.

To be useful as an image display, it is apparent that the output electrons from the line electron sources must be accurately modulated. Gray-scale modulation, that is, a selective gradation of a number of electrons permitted to strike the screen, can be accomplished by use of a modulation mask. The modulation mask includes a metal layer having a plurality of substantially identical slots which are disposed in parallel rows and columns, each slot being associated with a picture element. Each slot is surrounded by a sensing pad insulatingly mounted on the surface of the metal adjacent to the electron multiplier and is also surrounded by a modulating electrode insulatingly mounted on the opposite surface of the metal layer. The sensing pads function as capacitors which are charged uniformly from slot to slot. This uniform charging of the sensing pads assures that the amount of electrons passing through each slot is substantially uniform from slot to slot upon discharge of the pads by the line electron sources. A modulating voltage is applied to each of the modulating electrodes on the opposite surface of the modulation mask. If the modulating voltage varies continuously (i.e., in an analog fashion) as a function of the video signal, then the modulating electrodes, with the modulating voltages applied thereto, will permit a continuously varying (from full charge to zero) amount of electrons to impinge upon the phosphor screen, thus controlling the brightness of the image appearing at that picture element.

It is characteristic of analog modulation of the sensing pad modulation mask that while full brightness uniformity can be achieved simply by holding geometrical tolerances, lower level signals are much more difficult to hold to a desired tolerance level of full brightness of approximately 1% element-to-element. Consequently, while full brightness can be controlled uniformly from element-to-element, displayed information having less than full brightness can vary considerably outside the desired brightness uniformity tolerance. This non-uniformity at lower brightness levels occurring with analog modulation can have a deterimental effect on the overall quality of the video display.

SUMMARY OF THE INVENTION

An image display device comprises a matrix of cathodoluminescent cells. Each cell includes a source of electrons and an electron multiplier, having at least one dynode member. The electron multiplier is open to feedback and of sufficiently high gain to produce regenerative feedback and sustained electron emission. Also included are digital modulation means for modulating the flow of electrons, means for accelerating the modulated flow of electrons and a cathodoluminescent screen which is excitable by the accelerated and modulated flow of electrons.

DETAILED DESCRIPTION OF THE INVENTION

Figure 1:
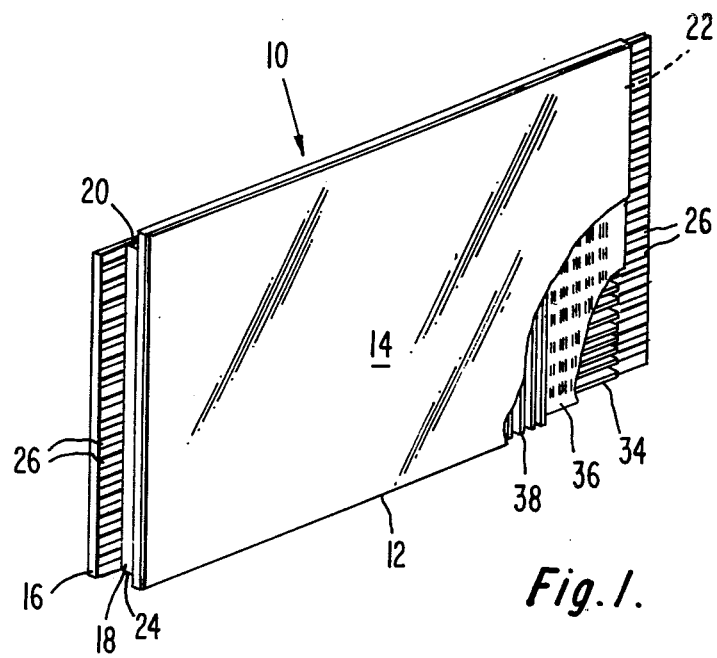
FIG. 1 is a partially broken away isometric view of an image display device which utilizes the digital modulation scheme of the present invention.

One embodiment of a flat image display device 10 which employs the digital modulation scheme of the present invention is shown in FIG. 1. The device 10 includes an evacuated glass envelope 12 having a flat transparent viewing front panel 14 and a flat back panel 16. The front and back panels 14 and 16 are parallel to each other and are sealed together by peripheral sidewalls 18, 20, 22 and 24. Sidewalls 18 and 22 include terminal areas which include a series of electrically conductive electrodes 26 extending therethrough to provide electrical conduction means for activating and controlling the device 10. In one embodiment, the overall dimensions of the device 10 are 75 cm high by 100 cm wide by 2.5 cm thick. The device 10 may have several different internal structures with at least one common property; the particular internal structure selected must be capable of supporting the front and back panels 14 and 16 of the glass envelope 12 against atmospheric pressures when the glass envelope 12 is evacuated.

Figure 2:
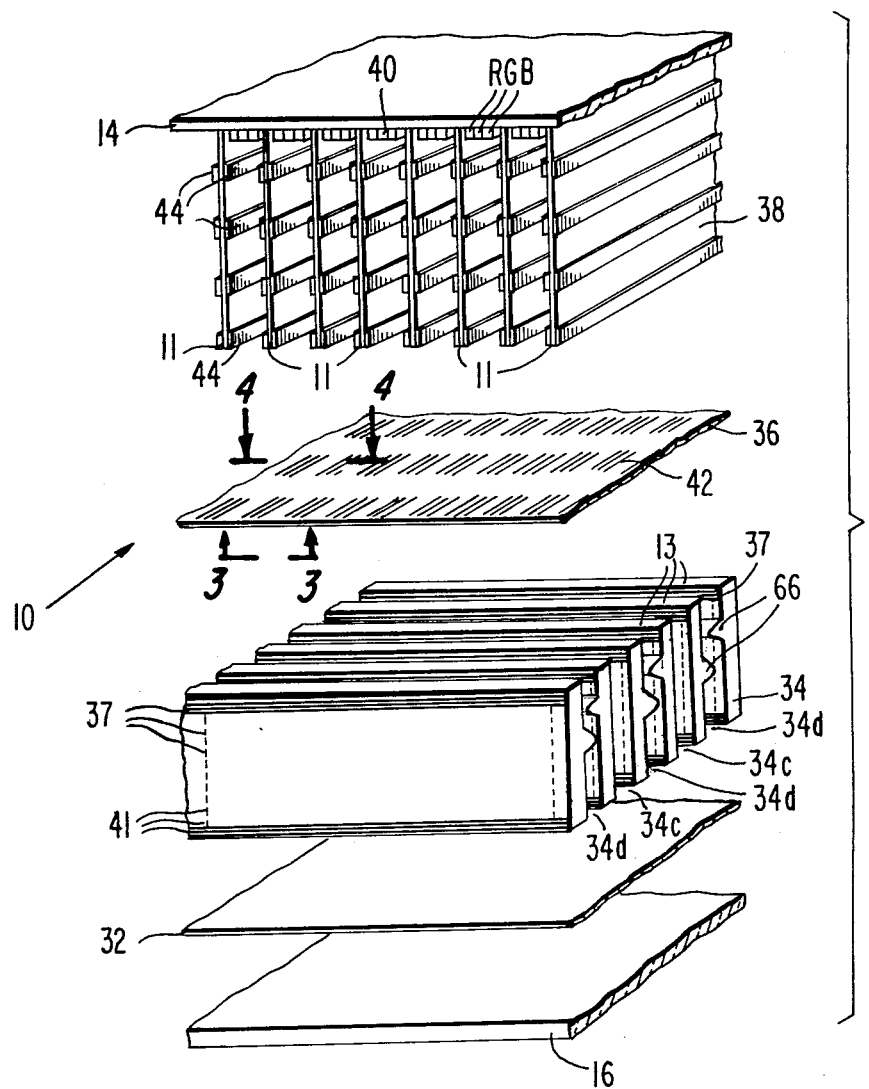
FIG. 2 is an exploded view of the image display device of FIG. 1.

The image display device 10 includes two orthogonal sets of parallel insulating vanes positioned between the front panel 14 and the back panel 16, as shown in FIG. 2. One set comprises vanes designated as 11; the other set comprises vanes designated as 13. A modulation mask 36 is sandwiched between the two sets of orthogonal vanes 11 and 13. A large area cathode 32 is supported by the back panel 16. The cathode 32 may be a photoemissive material, such as barium, where optical feedback is employed as a means of sustaining cathode electron emission. High ion secondary emission cathode materials are suitable in situations where ion feedback is desirable as the means of sustaining cathode electron emission. The device 10 may be described as including a plurality of cells, or picture elements, each cell of which correspond to the intersections of the two orthogonal sets of vanes 11 and 13 respectively, and a modulation mask 36 therebetween.

The parallel vanes 13 function as an electron multiplier section 34. The multiplier section 34 is divided into a plurality of electron multipliers which are determined by each consecutive pair of vanes 13. The multiplier section 34 may be referred to as including a plurality of line electron multipliers 34d and 34c arranged in alternate fashion. The line multipliers 34d and 34c each include a plurality of dynodes 41 included on the opposing surfaces between each pair of vanes 13. The geometric configuration of the dynodes 41 is such that electrons emitting from the surface of one dynode are steered to the surface of the next dynode when appropriate voltages are applied. The dynodes 41 are of a material having a high secondary emission ratio $\delta$, e.g., magnesium oxide ($\delta$ greater than 2.0).

Figure 7:
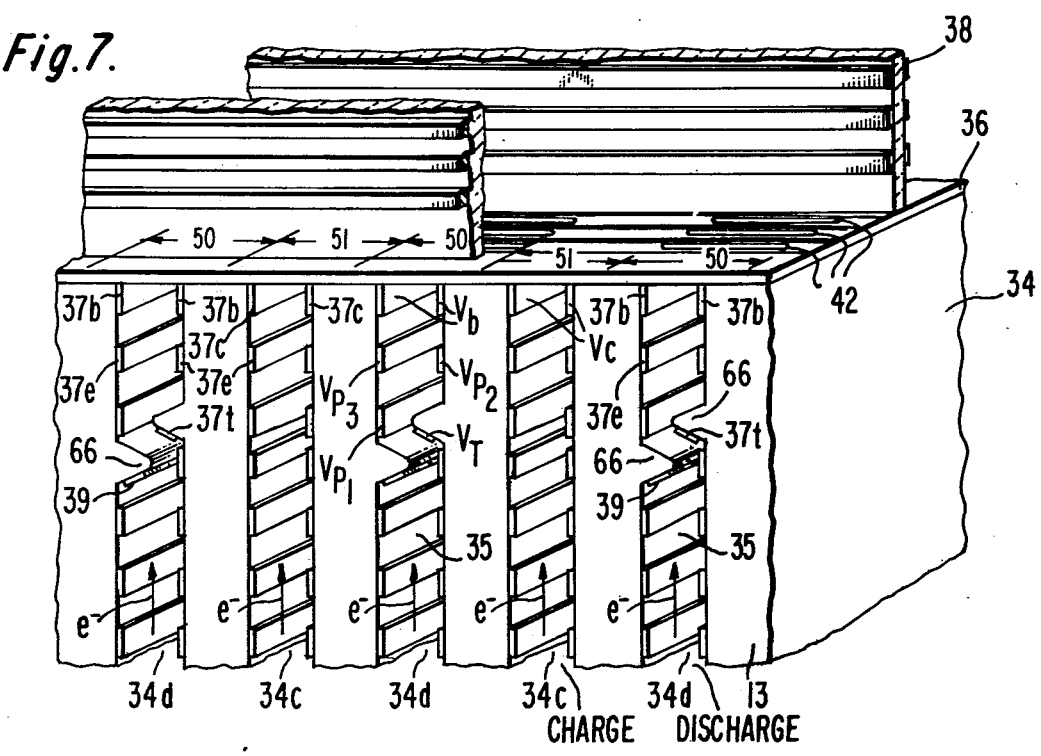
FIG. 7 is a partially broken away isometric view of a portion of the image display device of FIG. 1.

Each of the line multipliers 34d and 34c includes a plurality of electrodes 37 which extend parallel to its major axis. The electrodes 37 are disposed on the opposing surfaces between each pair of vanes 13. One pair of these electrodes 37, further designated as potential barrier electrodes 37b, is disposed at one end of the line multiplier 34d in proximate relation to the modulation mask 36, as shown in FIG. 7. A structurally similar pair of electrodes 37, further designated as collector electrodes 37c, is disposed at one end of the line multiplier 34c in proximate relation to the modulation mask 36.

Figure 6:
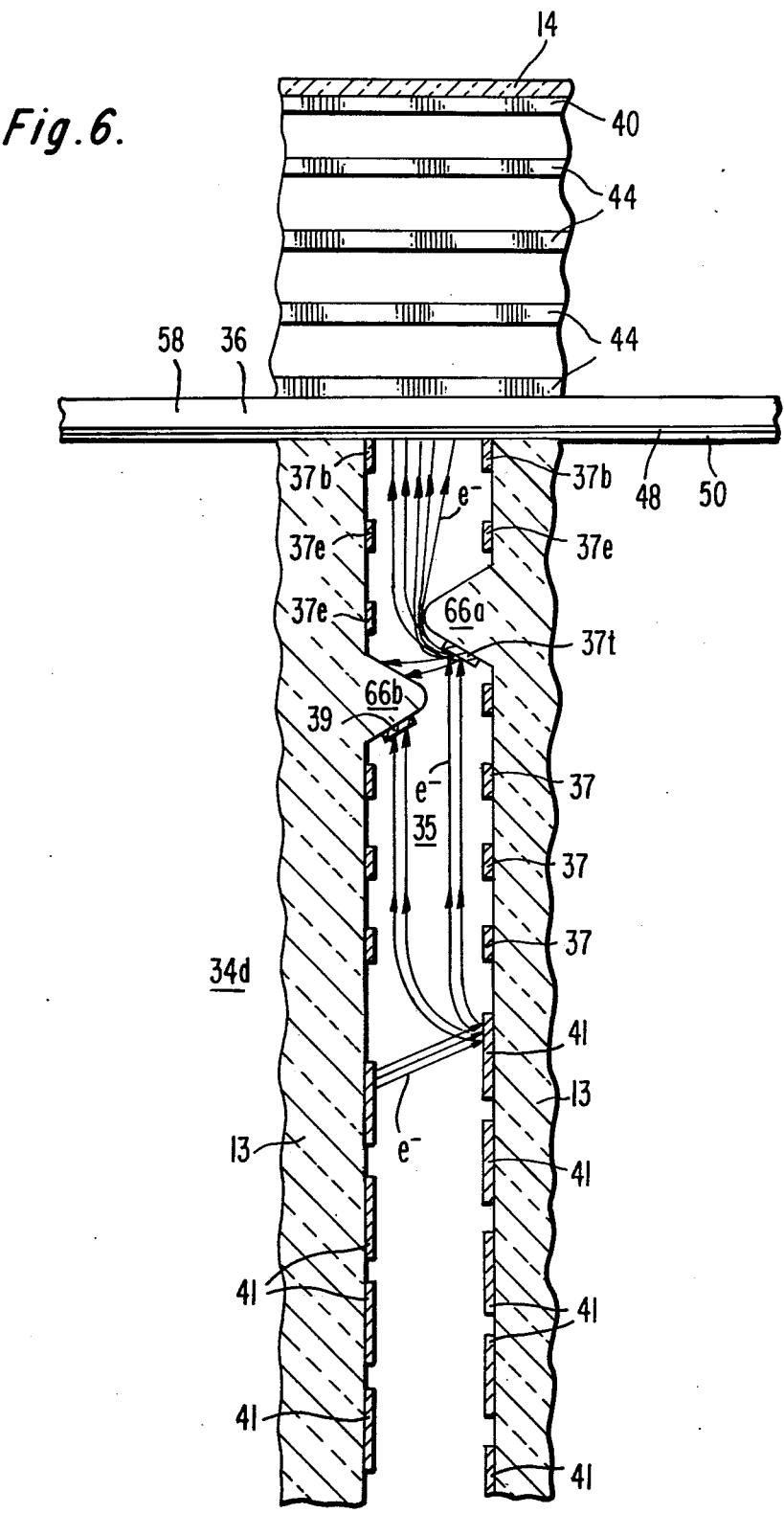
FIG. 6 is a sectional view of one cell in the image display device of FIG. 1 showing the mechanism by which a line source of electrons is achieved.

Each of the line multipliers 34d includes a high energy electron filter 66, as shown in FIGS. 2, 6 and 7. The filter 66 is defined by protrusions 66a and 66b which extend from the vanes 13, as clearly shown in FIGS. 6 and 7. The shape of the protrusions 66a and 66b is such that the filter 66 is optically opaque, i.e., there is no straight path therethrough. An electrode 37, further designated as target electrode 37t is disposed on the surface of the protrusion 66a which faces the protrusion 66b. Another group of the electrodes 37, further designated as extract electrodes 37e, are disposed between the potential barrier electrodes 37b and the filter 66. The surface of the protrusion 66b which faces into the line multiplier 34d can be coated with a body 39 of a material which will create photon feedback to the cathode 32. For example, the body 39 may be a phosphor material, such as lanthanum phosphate, cerium doped.

The line multipliers 34c are substantially the same as the line multipliers 34d with which they are interlaced. An important structural distinction is that the line multiplier 34c need not have the high energy electron filter 66, as shown in FIG. 7. The line multipliers 34c can have a UV phosphor disposed at their output end (not shown) if optical feedback is desired.

The other set of parallel vanes 11 functions as the accelerating and focussing section 38, as shown in FIG. 2. The accelerating and focussing section 38 may be a relatively open structure which is sandwiched between the cathodoluminescent screen 40 and the modulation mask 36. The screen 40 comprises parallel phosphor stripes which are located on the inner surface of the front panel 14. Several phosphor stripes, e.g., Red (R), Green (G), and Blue (B), are disposed between each consecutive pair of parallel vanes 11. The phosphor stripes are parallel with the vanes 11 of the accelerating and focussing section 38. A plurality of electrodes 44 are disposed on the opposing surfaces between each consecutive pair of vanes 11.

The modulation mask 36 is a substantially planar body having a plurality of identical apertures 42 therein, preferably in the form of slots, which are disposed in parallel rows and columns, as shown in FIG. 2. The columns of slots 42 are disposed with their major axes aligned with the corresponding phosphor stripes of the cathodoluminescent screen 40. Each consecutive pair of vanes 11 in the accelerating and focussing section 38 includes three columns of slots 42 and the three corresponding phosphor stripes, although greater or lesser numbers of stripes and slots may be included. The slots 42 are of a length ($L_s$) at least sufficient to equal the opening defined by each line multiplier 34d and are of a width ($W_s$) sufficient to correspond to each of the phosphor stripes (FIG. 3).

Figure 5:
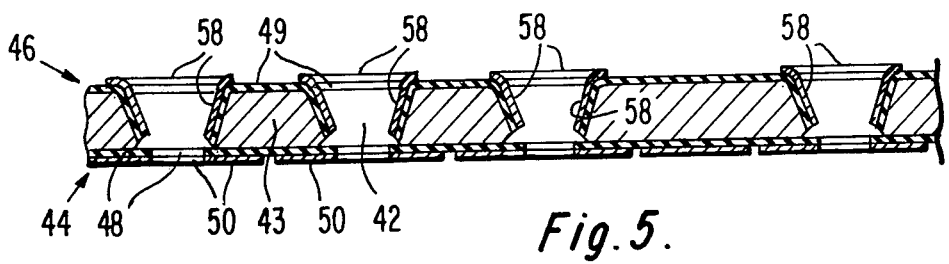
FIG. 5 is an enlarged cross-sectional view of the modulation mask taken along line 5—5 of FIG. 3.

The modulation mask 36 includes a substantially planar thin metal sheet 43, e.g., less than 0.025 cm thick, as can be more clearly seen in FIG. 5. Suitable materials include those which can be conveniently worked and which are electrically conductive, e.g., aluminum or aluminium-magnesium alloys. For purposes of description, the sheet 43 includes surfaces 44 and 46. The slots 42 in the sheet 43 are shaped with a narrow end at the surface 44 and a wide end at the surface 46 so that the edges of the slots taper away from the narrow end of the slot. The slots 42, for example, may have a width ($W_s$) of 75 microns (narrow end) and a length ($L_s$) of 0.075 cm. On the surfaces 44 and 46 of the sheet 43 are insulating layers 48 and 49, respectively, as shown in FIG. 5. The insulating layers 48 and 49 are of a material which is a relatively good insulator, such as aluminum oxide, having a thickness of about 25 to 50 microns. A plurality of substantially identical charge sensing pads 50, e.g., metal contacts of aluminum, are disposed on the insulating layer 48 as can be seen more clearly in FIG. 3. Each of the slots 42 is in abutting relation with a single sensing pad 50 which surrounds the slot.

The charge sensing pads are segmented, i.e., they extend for less than the full number of rows of slots 42. In order to obtain the segmented charge sensing pads 50, it is necessary to provide sensing pad separations 52. Each of the sensing pads 50 actually completes a capacitor which comprises the metal sheet 43, the insulating layer 48 and the metal contact (sensing pad 50), as shown in FIG. 5.

Figure 3:
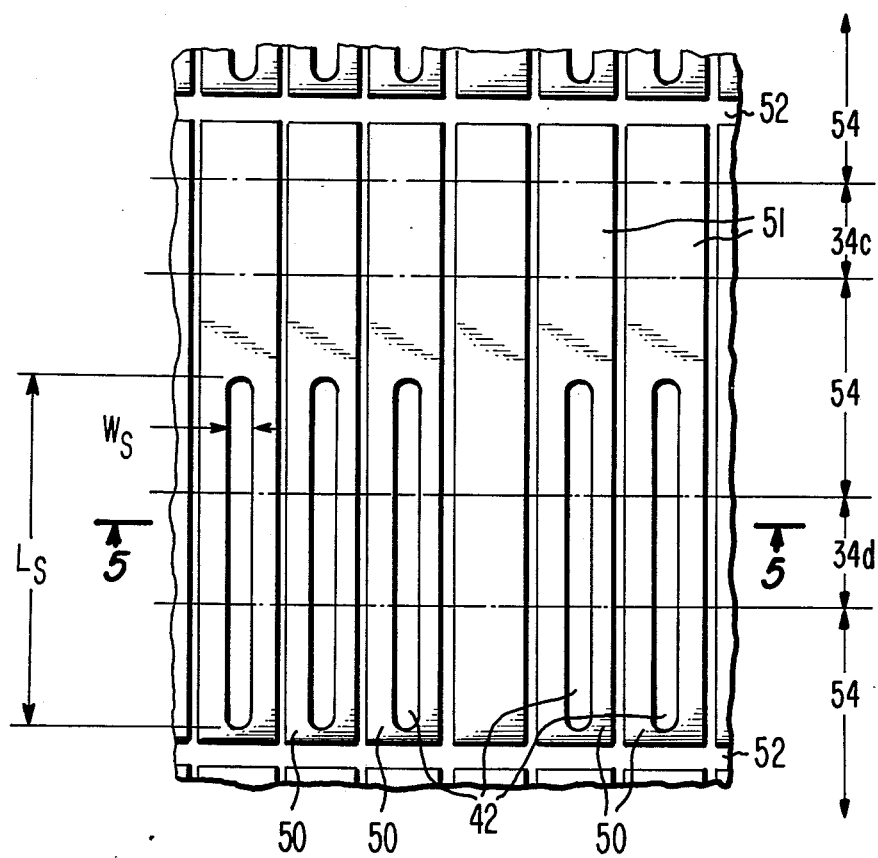
FIG. 3 is a plan view of a portion of a modulation mask taken along line 3—3 of FIG. 2.

Each sensing pad 50 includes a portion 51 which extends beyond the length of the slot 42, as shown in FIG. 3. The extended portion 51 has on its surface a material having a high secondary emission ratio. By a high secondary emission ratio, or coefficient, it is meant those materials having a secondary emission ratios greater than about 1, i.e., metal oxides, such as aluminum oxide, and most metals including aluminum. The extended portion 51 of the sensing pad 50 can be provided by extending the metal sensing pad 50 beyond the slot 42, i.e., the sensing pad 50 and the extended portion 51 can be part of an electrically continuous body.

Figure 4:
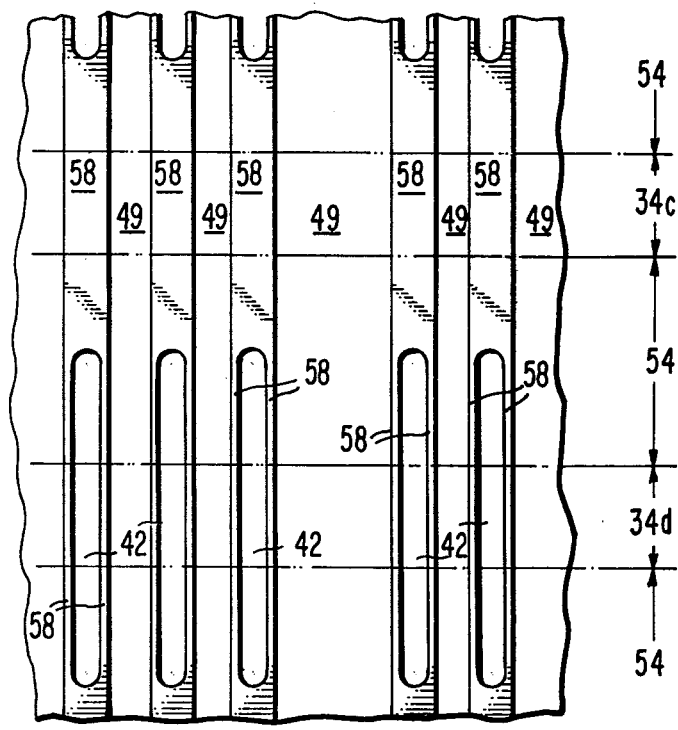
FIG. 4 is a plan view of a portion of the modulation mask taken along line 4—4 of FIG. 2.

A plurality of substantially parallel modulating electrodes 58 are disposed on the insulating layer 49 which is on the surface 46 of the metal sheet 43, as shown in FIGS. 4 and 5. Each modulating electrode 58 extends around one of the parallel columns of slots 42. In the slot 42, the modulating electrode 58 is disposed on the insulating layer 49 on the sides of the slot so as to taper away from the narrow end of the slot. The modulating electrodes 58 should be an electrical conductor, e.g., a metal such as aluminum. In contrast to the segmented sensing pads 50, the modulating electrodes 58 extend for the full number of parallel rows of slots 42 i.e., they are not segmented, as shown in FIG. 4.

The modulation mask 36 can be constructed through area processing techniques which are capable of forming an array of capacitance pads whose dimensions and capacitances are controllable to about 1%. The slots 42 can be formed by embossing an aluminum sheet 43 with an embossing tool whose dimensions have been photolithographically defined. The insulating layer 48 can be obtained by standard anodization techniques wherein the anodizing follows the embossed contours. As a result of the anodization, the surface of the aluminum is transformed into aluminum oxide. By limiting the anodization time, an aluminum oxide insulating layer can be formed which is 25 to 50 microns in thickness, as desired. Then, the insulating layer can be selectively etched to form the insulating layers 48 and 49. Metal contacts, i.e., sensing pads 50, and the modulating electrodes 58 can then be deposited, through any well known technique, e.g., evaporated and then defined through the use of well known photolithographic techniques.

The relative orientation of the elements in the display device 10 can be further described by referring to FIGS. 3 and 7. The major axes of the line multipliers 34d and 34c are in orthogonal relation to the major axes of the slots 42, as shown in FIG. 7. The output of the line multipliers 34d is directed toward the slots 42 and abutting sensing pads 50, as shown in FIG. 3. The negative barrier potential electrodes 37b are in proximate relation with the slots 42 and abutting sensing pads 50, as shown in FIG. 7. The output of the line multiplier 34c is directed toward the extended portions 51 of the sensing pads 50 as in FIG. 3. The collector electrodes 37c are in proximate relation with the extended portions 51 of the sensing pads 50, as shown in FIG. 7.

Between the outputs of each line multiplier 34d and 34c is a multiplier dead area 54, i.e., an area where there is no output, as shown in FIG. 3. The sensing pad separations 52 are positioned to lie in the dead area 54. Modulation mask inhomogenities can be reliably isolated in a multiplier dead area 54 even if multiplier construction or mask alignment techniques are somewhat imprecise.

The operation of the flat image display device 10 can now be described generally by referring to FIGS. 2, 6, 7 and 8. A line source of electrons is provided by applying appropriate voltages to the multiplier dynodes 41. In such a case, any spurious electron emitted near the multiplier cathode 32 will be allowed to pass up through and be multiplied within the multiplier 34d, producing $G_m$ electrons as the multiplier output, where $G_m$ is the multiplier gain. When the surfaces or volume near the output end 35 of the line multiplier 34d are coated or filled with gas or fluorescent species, e.g., element 39 of FIGS. 6 and 7, gas ions or light can be formed by bombarding electrons. In such a case, a certain number of gas ions or light photons will be able to pass back through the open multiplier 34d and strike the multiplier cathode 32. These ions or photons can produce additional cathode electrons. If the multiplier gain $G_m$ is sufficiently large, the ions or photons created near the multiplier output end 35 by the multiplication of a single cathode electron will feedback to the cathode 32 so as to produce more than an additional cathode electron. In this manner, current at the cathode 32 and within the multiplier 34d will continue to grow exponentially in what is termed "regenerative feedback" leading to sustained electron emission. The output current of the line electron multiplier 34d will eventually cease to grow through some mechanism, such as electronic space charge saturation. In this manner, the feedback multiplier 34d can be made to provide a line source of electrons.

As will later be described, the sensing pads 50 are provided with an initial electrical charge Q, where Q = CV. As previously described, the sensing pad 50 is on the insulating layer 48 such that the pad 50 has a predetermined capacitance (C) with respect to the metal sheet 43. The capacitance can be charged to a desired uniform voltage level (V). Once each of the pads is charged to this level, a substantially uniform maximum electrical charge, hereinafter referred to as a controlled charge, enters into each of the slots which are abutted by the pads as the pads are discharged.

Each time a controlled charge is directed through a slot 42, a picture element lights up on the screen 40. In the embodiment described herein, the directed charge comes from the line multipliers 34d which perform the function of creating the electrons which illuminate each of the display elements on the screen 40. Each line multiplier 34d corresponds to one full video line. The output of the line multiplier 34d also causes the previously charged sensing pads 50 to discharge to cutoff. These line multipliers can be referred to as DISCHARGE multipliers 34d since their function is to discharge the sensing pads 50. Once the sensing pads 50 are completely discharged, in order for that particular slot 42 or row of slots to be capable of passing additional display element charge to the screen 40 at a later time, the sensing pads 50 which abut the slot 42 must be charged again, preferably to their former desired voltage level. The charging of the sensing pad 50 can be obtained through secondary emission from the extended portion 51 of the sensing pad 50. For example, the output of the line multipliers 34c, i.e., CHARGE multipliers 34c, can be used to bombard the extended portions 51 with high energy electrons, as shown in FIG. 7. The CHARGE multipliers 34c are used exclusively to charge previously discharged sensing pads 50 back to the desired uniform level through secondary emission from the extended portions 51 of the sensing pads 50.

In the display device described herein, information is displayed a line at a time by addressing the DISCHARGE multiplier 34d corresponding to the line to be displayed. The modulation mask acts to modulate this line in a highly uniform fashion. When modulation voltages are such as to allow a maximum fraction of charge reaching the slot and sensing pads to pass through the mask slot, good uniformity and good charge control ensures. Such uniformity cannot be obtained when lesser fractions of charge are allowed to pass into the slot as controlled change. The digital modulation system of the present invention attempts to accentuate this controlled charge uniformity at maximum transmission, by passing a series of discrete controlled charge packets each of which is either zero charge or the maximum controlled charge. This approach can be used regardless of the number of gray levels to be displayed. By pulsing the DISCHARGE multiplier 34d, corresponding to the line to be displayed, N times within each line time, at least N levels of gray can be achieved in one line time. For example, if full brightness were equivalent to N pulses, less than full brightness would then be achieved by using the modulation electrodes 58 to turn off the appropriate slots 42 located on each line at various times during the N pulse sequence.

To obtain a display having M levels of brightness resolution, a continuum of options in digital modulation exists, running from $N = 1$, a single pulse with a requirement for M level modulation of that pulse, to $1 < N < M$ with reduced requirements on the ability to hold the various pulse levels, to $N = M$ requiring only single level pulsing. The exact number of pulses which are used depends on the tradeoff encountered between achieving many fast pulses and achieving accurate pulse-level modulation.

If a display structure permits accurate pulse-level modulation, then it is possible to modulate with fewer, but multi-leveled pulses. For example, where M equals 63 levels of gray, a simple, single pulse-level approach would require 63 individual pulses. But if two additional distinct pulse-levels having relative strengths of ½ and ¼ of full-level are used, then 63 levels could be achieved with only 15 full-level pulses, one half-level and one quarter-level pulse. In the same manner, if a ⅛ level pulse is added, then 127 levels of gray could be attained with only 18 individual pulses.

Using the modulation mask previously described, various pulse levels can be achieved in the following manner. When the DISCHARGE multiplier 34d is fired, the sensing pads 50 surrounding the modulation mask slots 42 discharge to almost 0 volts. They then must be charged back to an approximately +50 volt level to await the next charge pulse. As stated previously, charging is accomplished by bombarding the extended portions 51 of the sensing pads 50 with current from the CHARGE multiplier 34c as indicated in FIG. 7. A pair of collector electrodes 37c, biased to +50 volts, collect secondary electrons from the pad until the pad reaches almost +50 volts. If these collector electrodes 37c are biased to +25 volts or +12.5 volts, the pad will be precharged to approximately +25 or approximately +12.5 volts, and the charge on the sensing pads 50 will be ½ and ¼ of full charge, resulting in ½ or ¼ of full controlled charge passing into the mask slots 42, as the pads are discharged by DISCHARGE multiplier 34d. It is important to note that these lowered charge levels still pass through the mask slots 42 with modulation electrodes 58 biased to pass a maximum charge, thus retaining the good brightness uniformity inherent in this mode of operation. Various pulse levels may be attained with this approach but the example of ½-level and ¼-level pulses to attain 63 levels with $N = 17$ pulses will be used through the remainder of the description.

Figure 8:
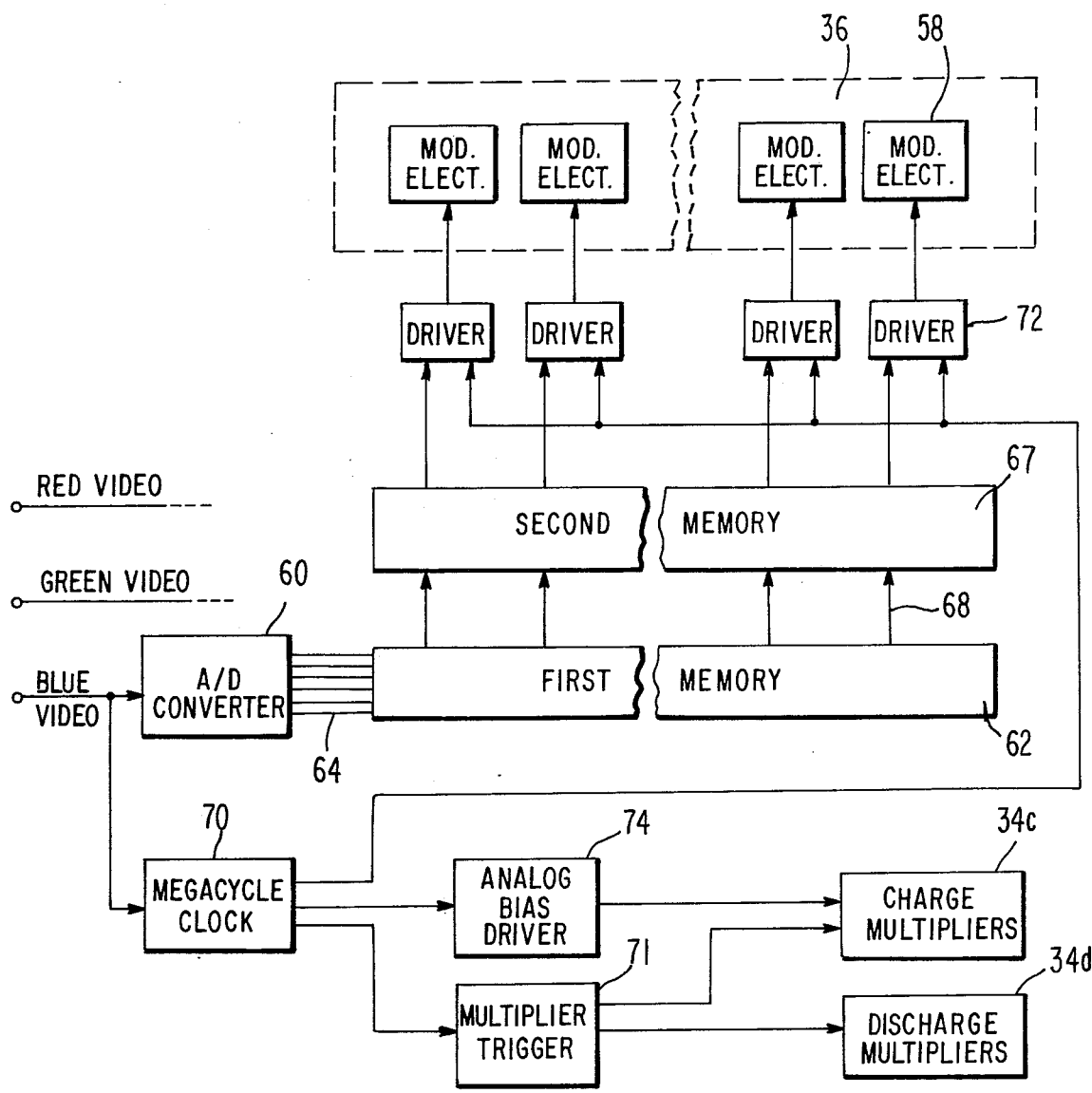
FIG. 8 is a schematic block diagram of the digital modulation system of the present invention.

FIG. 8 is a schematic block diagram of the digital modulation system employing a modulation mask. Video signals for red, green, and blue are each processed through an analog/digital converter 60, producing a coded signal. For simplicity, FIG. 8 shows the processing of the blue video signal only. Processing of the red and green video signals is performed in the same manner. This coding is standard binary which can be subsequently recoded, if required, to the coding used in addressing the display device.

Figure 9:
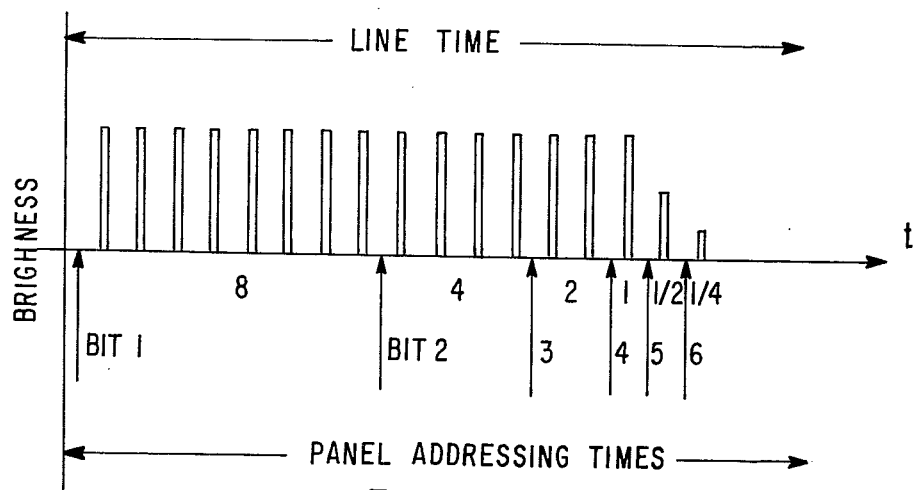
FIG. 9 is a plot showing an example of anode current pulses for full brightness.
Figure 10:
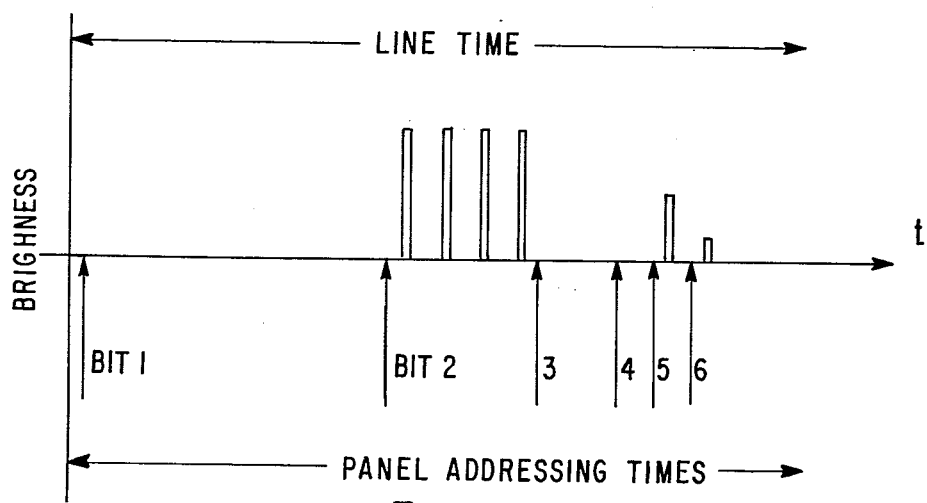
FIG. 10 is a plot showing an example of anode current pulses for substantially 30% of full brightness.

For the example indicated in FIGS. 8, 9 and 10, coding used in device addressing is also simple binary. The example shows 6-bit coding of the video capable of producing a 63 level signal. Assuming that there are 700 blue picture elements per video line (in addition to 700 red and 700 green for a total of 2100 picture elements per video line), the 6-bits of video information per element is commutated into a first 700 × 6-bit memory 62 in real time over a multiconductor path 64. The 700 × 6-bits are subsequently transferred in parallel to a second 700 × 6-bit memory 67 during horizontal retrace time by way of a multiconductor path 68. Total system storage for this example is 8.4 k-bits per color or ~25k-bits total.

Electronics through the first memory 62 are clocked to an external or real time video signal. Electronics including and beyond the second memory 67 are clocked to a "megacycle clock" 70, triggered by the real time video-signal but cycling once during each line time. This "megacycle clock" performs three functions. First, it signals a selected DISCHARGE multiplier 34d, through a multiplier trigger 71, to fire at 17 equally spaced times during a line time. This causes uniform charge packets to pass into each of 2100 mask slots 42 on the selected line for each of the 17 line pulses (see FIG. 9). It also causes the sensing pads 50 to discharge. Equally interspersed between the 17 pulses discharging the sensing pads 50 are 17 pulses from a CHARGE multiplier which cause the sensing pads 50 to recharge to their appropriate initial positive values. Thus, the "clock" signals a pair of multipliers associated with the selected video line to switch "on" at 34 equally spaced time intervals during each line time. Second, the "megacycle clock" triggers 2100 modulation electrode drivers 72 to switch the modulation electrodes 58 "on" or "off" at six panel address times which are indicated for this example in FIG. 9. The third function of the megacycle clock is to signal a pulse "bias" driver 74 to change the voltage applied to the collector electrode 37c, and thus the initial pad charge voltage, in such a fashion as to cause the final two of 17 charge packets passing into the slots to be ½ to ¼ of full value.

During the "off" cycle time, the DISCHARGE multiplier 34d is off and, if the time is appropriate to switch the information on the modulation electrodes 58, then the megacycle clock 70 triggers the second memory 67 to step 700 bits from the memories for each of the three colors to the 2100 drivers 72 associated with the 2100 modulation mask modulation electrodes 58. Each driver reads the bit it receives and either switches on or off. When shut off, the driver supplies a repelling voltage to its associated modulation electrodes 58 preventing current from passing through that particular mask slot 42.

At appropriate times while the megacycle clock 70 cycles, particular modulation electrodes 58 are switched on or off, and the selected DISCHARGE multiplier 34d is fired for a fraction of the line time divided by 2N which is approximately 2 microseconds for the embodiment described herein. During this DISCHARGE multiplier pulse, each of the 2100 modulation mask sensing pads 50 (see FIG. 3) for that line must charge negative from pad voltages approximately equal to +50 volts or integral fraction thereof back to approximately zero volts, with charge passing through only those slots 42 which are addressed "on". If no current is to be wasted, the sensing pad capacitances must be such as to allow an amount of charge to pass to the screen for the full pulse which is approximately $1 \div N$, or 1/17th for this embodiment, of what is needed to produce 100 ft-lamberts at the screen.

The system as described so far involves addressing the 2100 modulation electrodes 58 on the modulation mask 36 with 2100 driver circuits 72, each of which is switched to either an "on" or an "off" voltage during appropriate times in the 17 cycles within a 60 microsecond line time. The DISCHARGE multiplier 34d (see FIG. 2) is fired once during each of these 17 cycles, causing the sensing pads 50 to discharge, and a fixed, uniform amount of charge to pass through each "on" slot 42. The amount of charge passing through a slot 42 having a full brightness "on" pulse applied is proportional to the sensing pad capacitance C and the initial voltage V on the sensing pad, as previously described.

A principal advantage of the digital modulation system described herein is that is overcomes the problem of non-uniformity encountered when attempting to use a modulation mask for low level gray scale modulation, by operating the modulation electrodes 58 only at voltages which pass either a maximum friction or no charge through the slots 42. As an example of the high uniformity obtainable, the approximately 30% of full brightness signal indicated for the 63 brightness level example shown in FIG. 10 consists of six pulses, each of which passes the slot 42 with modulation electrodes 58 biased to pass full charge. If the modulation has been attempted by biasing modulation electrodes 58 to pass only 30% of full charge in a single pulse, uniformity would be substantially reduced by the high sensitivity of slot transmission to slot dimensions at these lowered transmission values.

Additional advantages inherent in this system over analog systems using a modulation mask include decoupling of the required modulation voltage from the $\geq 50$ volt pad voltage excursion set by secondary emission energy uncertanties. This permits lower on/off modulation voltage swings which, in turn, allows the use of integrated circuits for driving these mask modulation electrodes. In addition, the digital nature of the modulation eliminates the need for high voltage analog uniformity in these drive circuits.

I claim:

1. An image display device comprising a matrix of cathodoluminescent cells, each cell including:
   a. a source of electrons;
   b. an electron multiplier, including at least one dynode member for multiplying electrons emitted from said electron source, said multiplier being open to feedback and of sufficiently high gain to produce regenerative feedback and sustained electron emission;
   c. digital modulation means for modulating a flow of electrons from an output of said electron multiplier;
   d. means for accelerating the modulated flow of electrons; and
   e. a cathodoluminescent screen excitable by the accelerated and modulated flow of electrons.

2. An image display device in accordance with claim 1 in which said digital modulation means comprises:
   a. means for periodically generating a group of electrons from the output of said electron multiplier, said group comprising at least one discrete charge packet;
   b. means for controlling the magnitude of said charge packet with said charge packet being substantially uniform among said cells; and
   c. means for controlling the passage of said controlled magnitude charge packets to said accelerating means.

3. An image display device in accordance with claim 2 in which said means for periodically generating said electron groups comprises:
   a. addressing logic means for enabling said electron multiplier to operate;
   b. dynode control means for applying appropriate voltages to dynode members included in said enabled multiplier; and
   c. digital clock means for periodically pulsing at least one of said applied voltages.

4. An image display device in accordance with claim 3 in which said means for controlling the magnitude of the charge packets comprises:
   a. a substantially planar modulation mask disposed between the output of said electron multiplier and said accelerating means, said modulation mask comprising:
      i. a metal layer having an aperture therein to permit passage of electrons from said electron multiplier to said accelerating means; and
      ii. a sensing pad bracketing said aperture, said pad being disposed on and electrically insulated from a surface of said metal layer facing said electron multiplier and capacitively coupled to said metal layer;
   b. means for charging said sensing pad to a predetermined charge voltage; and
   c. means for discharging said sensing pad to a predetermined discharge voltage, the controlled magnitude of said charge packets being proportional to the difference between said charge voltage and said discharge voltage.

5. An image display device in accordance with claim 4 in which said means for charging said sensing pad comprises a pad charging electron multiplier positioned adjacent said electron multiplier with an output of said pad charging electron multiplier located opposite at least a portion of said charge sensing pad and having at least one collector electrode adjacent said output wherein said sensing pad charges, as a result of secondary emission caused by the bombardment of said sensing pads by electrons from said pad charging multiplier, to a charge voltage substantially equal to the magnitude of a voltage applied to said collector electrode.

6. An image display device in accordance with claim 5 in which said means for discharging said sensing pad comprises at least one potential barrier electrode adjacent the output of said electron multiplier for substantially preventing secondary electrons from escaping from said sensing pad as a result of bombardment by electrons from said electron multiplier.

7. An image display device in accordance with claim 6 in which said means for controlling the passage of said controlled magnitude charge packet to said accelerating means comprises:
  a. a modulation electrode bracketing the aperture in said modulation mask, said modulation electrode being insulatingly disposed on said metal layer between said sensing pad and said accelerating means; and
  b. digital control circuitry for converting an externally generated video signal into a series of digitally pulsed voltages applied to said electrodes, each pulse being substantially coincident with the generation of each controlled magnitude charge packet for selectively permitting the passage of a desired number of said controlled magnitude charge packets through the aperture in the modulation mask to the accelerating means.

8. An image display device comprising a matrix of cathodoluminescent cells, each cell including a line source of electrons, digital modulation means for modulating a flow of electrons from an output of said line source of electrons, means for accelerating the modulated flow of electrons and a cathodoluminescent screen excitable by the accelerated and modulated flow of electrons wherein said digital modulation means comprises:
  a. means for periodically generating a group of electrons from the output of said line electron source, said group comprising at least one discrete charge packet;
  b. means for controlling the magnitude of said charge packets comprising:
    i. a substantially planar modulation mask disposed between the output of said line electron source and said accelerating means, said modulation mask comprising a metal layer having an aperture therein to permit passage of electrons from said line electron source to said accelerating means and a sensing pad bracketing said aperture, said pad being disposed on and electrically insulated from a surface of said metal layer facing said line electron source and capacitively coupled to said metal layer;
    ii. means for charging said sensing pads to a predetermined charge voltage; and
    iii. means for discharging said sensing pad to a predetermined discharge voltage, the controlled magnitude of said charge packets being proportional to the difference between said charge voltage and said discharge voltage; and
  c. means for controlling the passage of said controlled magnitude charge packets to said accelerating means.

9. An image display device in accordance with claim 8 in which said line source of electrons comprises an electron multiplier, including at least one dynode member, said multiplier being open to feedback and of sufficiently high gain to produce regenerative feedback and sustained electron emission.

10. An image display device in accordance with claim 9 in which said means for periodically generating said group of electrons comprises:
  a. addressing logic means for enabling said electron multiplier to operate;
  b. dynode control means for applying appropriate voltages to the dynode members included in said enabled multiplier; and
  c. digital clock means for periodically pulsing at least one of said applied voltages.

11. An image display device in accordance with claim 10 in which means for charging said sensing pads comprises a pad charging electron multiplier positioned adjacent said electron multiplier with an output of said pad charging multiplier located opposite at least a portion of said charge sensing pad and having at least one collector electrode adjacent said output wherein said sensing pad charges, as a result of secondary emission caused by the bombardment of said sensing pad by electrons from said pad charging multiplier, to a charge voltage substantially equal to the magnitude of a voltage applied to said collector electrode.

12. An image display device in accordance with claim 11 in which said means for discharging said sensing pad comprises at least one potential barrier electrode adjacent the output of said electron multiplier for substantially preventing secondary electrons frm escaping from said sensing pad as a result of bombardment by electrons from said electron multiplier.

13. An image display device in accordance with claim 12 in which said means for controlling the passage of said controlled magnitude charge packets to said accelerating means comprises:
  a. a modulation electrode bracketing the aperture in the modulation mask, said modulation electrode being insulatingly disposed on said metal layer between said sensing pad and said accelerating means; and
  b. digital control circuitry for converting an externally generated video signal into a series of digitally pulsed voltages applied to said electrodes, each pulse being substantially coincident with the generation of each controlled magnitude charge packet for selectively permitting the passage of a desired number of said controlled magnitude charge packets through the aperture in the modulation mask to the accelerating means.

* * * * *